US012666121B1

(12) United States Patent
Rader et al.

(10) Patent No.: US 12,666,121 B1
(45) Date of Patent: Jun. 23, 2026

(54) EVENT BROADCAST NATURAL LANGUAGE INTERFACE

(71) Applicant: Amazon Technologies, Inc., Seattle, WA (US)

(72) Inventors: Ziv Rader, Tel Aviv (IL); Bar Segev, Petah Tikva (IL); Yossi Biton, Rosh Haayin (IL); Avi Avraham Ben-Cohen, Holon (IL); Matan Karklinsky, Zur Hadassa (IL)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 18/504,110

(22) Filed: Nov. 7, 2023

(51) Int. Cl.
| | |
|---|---|
| *H04N 21/8549* | (2011.01) |
| *H04N 21/431* | (2011.01) |
| *H04N 21/472* | (2011.01) |

(52) U.S. Cl.
CPC ..... *H04N 21/8549* (2013.01); *H04N 21/4312* (2013.01); *H04N 21/47217* (2013.01)

(58) Field of Classification Search
CPC ........... H04N 21/8549; H04N 21/4312; H04N 21/47217
See application file for complete search history.

(56) References Cited

U.S. PATENT DOCUMENTS

| | | | | |
|---|---|---|---|---|
| 9,715,901 | B1 * | 7/2017 | Singh | ................. H04N 21/8547 |
| 10,182,271 | B1 * | 1/2019 | Sanchez | ........... H04N 21/47217 |

| | | | |
|---|---|---|---|
| 10,433,030 | B2 | 10/2019 | Packard et al. |
| 10,714,145 | B2 | 7/2020 | Kulkarni et al. |
| 11,122,341 | B1 | 9/2021 | Decrop et al. |
| 11,425,469 | B2 | 8/2022 | Trollope et al. |
| 11,664,053 | B2 | 5/2023 | Raju et al. |
| 11,670,085 | B2 | 6/2023 | Verma et al. |
| 11,705,161 | B2 | 7/2023 | Ebong |
| 11,830,241 | B2 | 11/2023 | Merler et al. |
| 11,956,516 | B2 | 4/2024 | Shichman et al. |
| 11,962,833 | B2 | 4/2024 | Kraegeloh et al. |
| 11,962,838 | B2 | 4/2024 | Yelton et al. |
| 12,167,108 | B1 * | 12/2024 | Dubey ............... H04N 21/6587 |
| 12,283,291 | B1 * | 4/2025 | Sarfati .............. H04N 21/8106 |
| 12,301,960 | B1 | 5/2025 | Ben-Cohen et al. |
| 2006/0059120 | A1 | 3/2006 | Xiong et al. |
| 2015/0110468 | A1 | 4/2015 | Abecassis et al. |
| 2016/0105708 | A1 | 4/2016 | Packard et al. |
| 2016/0217329 | A1 * | 7/2016 | Kang ...................... G06T 11/60 |
| 2018/0199102 | A1 | 7/2018 | Gross |
| 2019/0356951 | A1 * | 11/2019 | Selim ................... G06V 40/172 |

(Continued)

*Primary Examiner* — John R Schnurr

(74) *Attorney, Agent, or Firm* — Knobbe, Martens, Olson & Bear, LLP

(57) ABSTRACT

The application describes systems and methods for accepting a request in a natural language command to retrieve and presentation information regarding an event broadcast. The natural language command can be processed by a natural language processor to identify moment metadata, such as a moment type from the event broadcast. The system can utilize the moment type to retrieve data compiled by components of the system to create a media representation. The media representation can be created to satisfy a requested presentation type identified by the natural language command and interpreted by the natural language processor. The media representation can then be presented to the user.

20 Claims, 5 Drawing Sheets

(56)          References Cited

U.S. PATENT DOCUMENTS

| 2019/0356952 A1* | 11/2019 | Leung ................. H04N 21/8549 |
| 2021/0149955 A1* | 5/2021 | Cannon .............. H04N 21/8456 |
| 2023/0230378 A1 | 7/2023 | Rfenacht et al. |
| 2023/0236442 A1* | 7/2023 | Shtukater ............... G02C 11/10 |
| | | 351/158 |
| 2023/0283878 A1 | 9/2023 | Huang et al. |
| 2024/0155197 A1* | 5/2024 | Engin .............. H04N 21/23418 |
| 2024/0163532 A1* | 5/2024 | Lythcott-Haims ........................... |
| | | H04N 21/4667 |
| 2024/0314396 A1 | 9/2024 | Streater |
| 2025/0008201 A1* | 1/2025 | Xu ...................... H04N 21/4884 |
| 2025/0150690 A1 | 5/2025 | Packard et al. |

* cited by examiner

400

EVENT BROADCAST NATURAL LANGUAGE INTERFACE

BACKGROUND

Recently, media content in digital formats have become widely available via network accessible systems. For example, users can stream events as they are being broadcast for viewing on televisions, computers, mobile phones, and other such user devices. Such events can be streamed via a network live as the event is taking place. Often, the event being streamed is recorded. Thus, a user may be able to re-watch a portion of the event or watch a portion of the event that the user initially missed.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF THE PREFERRED EMBODIMENT

Figure 1:
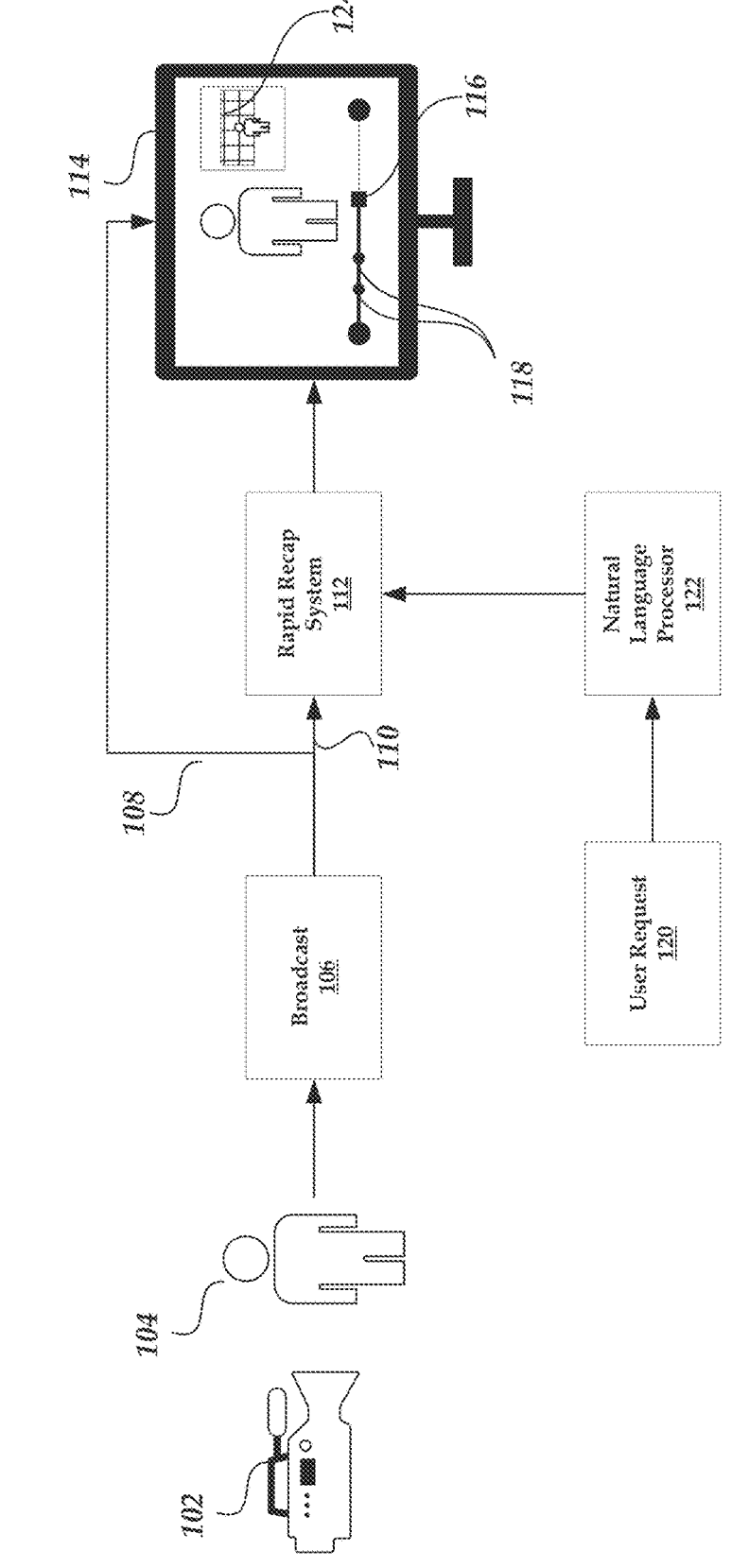
FIG. 1 is a block diagram of an interactive event broadcast system environment, according to one embodiment.

As described above, users can stream events as they are being broadcast for viewing on televisions, computers, mobile phones, and other such user devices. In some cases, users may join an event broadcast late or may want to view important moments or learn facts regarding the event broadcast as the event broadcast is showing. Often, event broadcasts are recorded, so a user could rewind the recording to re-watch important moments or watch important moments that the user initially missed. However, it can be difficult for the user to scroll through a recorded portion of the event broadcast and quickly identify important moments to watch. In some cases, the user may watch portions of the event broadcast in which the user is uninterested in order to find the portions of the event broadcast in which the user is interested. As a result, the user may miss portions of the event broadcast that are broadcast while the user is searching for the important moments.

To alleviate this issue, some conventional systems that broadcast events have an individual manual process the event broadcast to identify key moments in the event broadcast to make a highlight reel and/or to record statistics on the event shown in the event broadcast. In some cases, an event may be a sports broadcast in which a user may wish to review a highlight nearly immediately after the moment that leads to the highlight takes place and/or immediately after the broadcast concludes. Manual data interpretation by an individual to view, trim, and store highlight clips that would then be presented to the user would take time that may be longer than the time during which the user would expect to be able to view the highlight clips. As a result, the user may cancel the request to view highlight clips, turn off the broadcast, switch to another entertainment medium, and/or the like. Further, should a user turn on the event broadcast after the event broadcast has started, the user may want to watch some or all of the highlights that occurred up to the point at which the user turned on the event broadcast. Waiting for a manually created highlight clip may be unacceptable to the user.

Highlights of, for example, a soccer match, can include many different moments. A highlight reel, or moment reel, could include one or more of goals, penalties, potential penalties, injuries, remarkable plays, shots on goal, etc. A real-time moment reel (e.g., a moment reel that is generated and/or presented to a user within a threshold time (e.g., 1 second, 1 millisecond, 1 microsecond, etc.) of the user requesting to view highlights) that presents the moments a user wishes to see and omits others may be of interest to users. Individuals tasked with creating individual highlight reels, however, cannot create highlight reels that satisfy individual user requests in real-time. Thus, it may be desirable to provide an interactive event broadcast system that can, using video data, audio data, and/or metadata, interpret an event broadcast in real-time to provide users with highlights and event data that is selectable by the user. In this way, the user would experience reduced retrieval latency and could customize their event broadcast viewing experience.

However, it may be difficult to identify the appropriate portion of an event broadcast that constitutes a moment that is a highlight or significant statistical data. For example, an original, raw version of the event broadcast, such as a soccer match, may include multiple camera views, replays, and audio from commentors that span both the live action and a replay. Thus, it may be difficult to identify where the moment begins and ends and to determine what should be included as part of the moment. An individual watching the soccer match can logically decide when the moment is over. There further exist video processing algorithms and systems, such as machine learning and computer vision systems, which can be trained to detect certain images, such as a soccer ball entering into a goal, which constitutes scoring. However, machine learning and computer vision systems trained in conventional manners may be unable to determine specifically what content to include and not include in a moment, such as how far prior to the ball entering the goal and how long after to include in a moment.

Additionally, described herein is the interactive event broadcast system that utilizes a natural language interface to receive requests that can be natural language commands, interpret the natural language commands, and retrieve moment or data to fulfill the request. For example, a user could use an interface, such as a microphone, a keyboard, a menu, or the like to input a request in a natural language command. An example of a natural language command can include "Show me all goals so far." The natural language interface can interpret the natural language command to determine the action requested by the request.

While the interactive event broadcast system can receive an input via a keyboard, many users do not have a keyboard coupled to a device that presents an event broadcast. Such users may instead use a remote control or other wireless input device (e.g., a mobile phone) to select letters on a virtual keyboard presented on a screen to type out the request in the natural language format. For many users, selecting individual letters on a virtual keyboard using a remote control or other wireless device is cumbersome and can delay the query process. However, the interactive event broadcast system can overcome this technical issue in one of several ways. For example, the interactive event broadcast system can receive the request via a voice command and perform speech recognition on the voice command in the process of determining the action requested by the request, thereby allowing the user to skip entering a request via a virtual keyboard entirely and therefore improving the request submission experience for the user. As another example, the natural language interpretation performed by the interactive event broadcast system may be accurate enough to interpret abbreviated requests (e.g., a request that is not a complete phrase or sentence, such as "1 goals," which the system may interpret as meaning that the user is requesting to view all goals by Team 1). Thus, even if a user uses a virtual keyboard to enter a request, the interactive event broadcast system can limit the number of letters that a user may have to select in order to receive a desired result.

The interactive event broadcast system also provides a technical benefit over conventional systems that may attempt to rely on keywords to respond to user requests. For example, a request may be vague. A conventional system tasked with interpreting the request may have to perform the interpretation to determine what the user desires to see without providing non-desired information. For example, a user could request "Show all Athlete 1 penalties" to see all penalties committed by Athlete 1. A conventional system may analyze the natural language command and identify "Athlete 1" and "penalties" as keywords to search for within the database. However, without further natural language processing, the convention system could provide clips in which both Athlete 1 and a penalty are identified. Such moment clips may be overinclusive and include Athlete 1 next to the penalty, as the victim of a penalty, or goalkeeping against a penalty kick that resulted from a penalty. The interactive event broadcast system, however, can properly interpret the natural language command and return just those moment clips desired by a user (e.g., moment clips showing penalties committed by Athlete 1). To prevent showing moments without Athlete 1 committing the penalty, the natural language interface of the interactive event broadcast system can interpret the natural language command to further filter the moments to provide only the requested moments.

Further, a natural language command can include one or more conditions. For example, a natural language command may include a first condition and second condition which may be interpreted by the natural language processor to retrieve the appropriate data. A condition of a natural language command may be a portion of the natural language command that identifies a type or a characteristic of data to be retrieved that would satisfy at least the portion of the natural language command. One condition of a natural language command may be dependent on another condition of the natural language command, such that if one condition is present in the natural language command, the natural language processor 122 may interpret the condition to identify the other condition. As an illustrative example, a user could request to see "red cards committed by forwards." A first condition could be "forwards." A second condition may include identifying players that are forwards within the event. In some embodiments, the second condition may use the first condition to identify players that play a certain position on the field. The second condition may be clips that include both the players identified as forwards and red cards. An additional condition may be present, as stated above, that filters out any clip in which a forward did not commit a penalty.

Thus, described herein is an interactive event broadcast system that utilizes video data, audio data, and/or metadata to retrieve a relevant portion of an event broadcast by analyzing the event broadcast to collect a full moment. For example, a moment could be a goal scored in soccer. The interactive event broadcast system can process the video data, audio data, and/or metadata to determine which portions of the audio and video include the goal. Once identified, the portions of the audio and video can be trimmed to be a clip or a moment clip of the broadcast. The moment can be identified by processing the video to identify characteristics within the video that are associated with moment metadata. Moment metadata may be data associated with the event that can be used to interpret the event, such as a moment type, a name or position of an individual that performed an action, characteristics of an action, and/or the like. A moment type can indicate an action of the event. Actions can be characteristics or can include more than one characteristic performed by an individual. For example, an action can be a pass or kick of a soccer ball. As another example, an action can be a goal, in which the characteristics can include a kick of a soccer ball, an attempted save by a goalkeeper, and the soccer ball entering the goal. A moment for the moment type "goal" can include characteristics, such as the movement of the soccer ball into the goal or the movement of the net in response to a detected ball movement. Moment metadata can include some or all of the actions, moment types, and characteristics that can be used to determine a moment. The moment can further be identified using characteristics that lead up to the detected goal and can, for example, include the passes that lead up to the goal being scored and may not include the replay footage.

The interactive event broadcast system may additionally review the audio to identify audio characteristics that are associated with moment metadata such as moment types. Moment metadata can include metadata identified for an action or a moment that can be queried as a describer for a moment. Moment metadata can include identified moment types to indicate a moment may be found within the event data. For example, detecting an increase in volume from the commentator combined with the detection of the word "goal" may indicate, within the moment metadata, that a moment for the moment type "goal" occurred. Further, processing the audio may allow for the determination of a natural beginning time and ending time for the clip such that the audio is not started or stopped in the middle of any commentary. Additionally, the interactive event broadcast system can label the moment as having a particular moment type. The moment metadata or the moment type may be used to create compilations of moments at a user request. The system may retrieve all moments that are of a requested moment type or other requested identifiers queryable within the moment metadata and may combine them in an order using the moment and the event broadcast audio data and video data to create a moment reel. A moment reel can be one or more clips combined together and can include additional video data and audio data, to create a single clip to show the user. A user may request, for example, to see all penalties for the soccer match. The interactive event broadcast system can retrieve all moment types that are penalties and can combine them to create a cohesive moment reel to be presented to the user.

In addition, to accurately present the desired information to the user, the interactive event broadcast system can receive the request as a natural language command. The interactive event broadcast system can interpret the natural language command into a command usable by the computer to retrieve event broadcast data. The interactive event broadcast system may include a natural language processor that (1) identifies data the user requests; (2) identifies how the user expects to be presented the data; and (3) creates a retrieval message that can be interpreted by the computer to retrieve the requested data and compile the data into the requested format. A natural language processor may process the text to identify keywords, such as words that describe the moment type or describe other data such as moment metadata. Thus, interactive event broadcast system may retrieve the requested data, and thus combine the data to be presented to the user in the expected manner. Accordingly, instead of prompting a user to provide times in the event broadcast that the user would like to view, the interactive event broadcast system may allow a user device to provide a keyword, phrase, question, or prompt. In response, the interactive event broadcast system may return a corresponding portion of the event broadcast. Additional details of the interactive event broadcast system are described below with respect to FIGS. 1-6.

Example Interactive Event Broadcast Environment

FIG. 1 is a block diagram of an interactive event broadcast system environment 100, according to one embodiment. As illustrated in FIG. 1, the interactive event broadcast system environment 100 includes a capture device 102, an event 104, a broadcast 106, a broadcast feed 108, a processing feed 110, a rapid recap system 112, a presenting device 114, a live marker 116, moment markers 118, a user request 120, and a natural language processor 122. In an embodiment, the capture device 102 is in communication with systems that facilitate the creating and distributing the broadcast 106 via networks and other communication channels. The broadcast feed 103 and the processing feed 110 may be transmitted over satellite, a network, radio, airwaves, etc. and/or a combination thereof, each with transmission capabilities.

The rapid recap system 112 may receive and store the video data, audio data, and metadata from the processing feed 110 as the broadcast 106 and/or as portions of the broadcast 106 that constitute moments. Each moment may be associated with moment metadata that may include a moment type, event data, a broadcast time, and a play length, among other attributes. The moment type may represent the action captured within the moment (e.g., a goal, penalty, injury, etc.). The event data may include interpretations of the event as processed (e.g., the number and name of the player(s) in the moment, the team scoring, etc.). The broadcast time may be the time within the event broadcast the moment occurs. The play length may represent a time it takes a media player to play the entire content of the media file at a normal speed (e.g., 1× speed).

The rapid recap system 112 can detect moments by identifying, within the video feed and the audio feed, characteristics that are associated with moment types. The characteristics are used to trim the audio data and video data to create clips that encapsulate a moment. A clip may be configured to include actions leading up to the moment and may not include replay images that are broadcast 106 as part of the processing feed 110. Characteristics can be, for example, camera views, shot transitions, actions within the video, audio activity, etc. Further, using the characteristics, the rapid recap system 112 can rank moments to determine which moments are the most important to the event 104.

In some embodiments, the rapid recap system 112 can populate the moments onto the presenting device 114 for the user to interact with. The broadcasting feed 108 can be transmitted to the presenting device 114 to show the broadcast 106. Using a streaming service, the scheduled time duration of the broadcast 106 may be provided with a live marker 116 to indicate how far into the broadcast 106 the user is viewing. As the rapid recap system 112 identifies moments, the rapid recap system 112 may add additional markers, such as moment markers 118 alongside the live marker 116 to indicate times on the broadcast 106. The moment marker 118 may be interactive such that a user can select the marker to trigger presentation of the moment indicated by the moment marker 118. For example, as a soccer match is being played, a broadcast 106 may be streamed on a presenting device 114 for a user. The live marker 116 gives a graphical estimation of the time the soccer match has been played and how long the soccer match has remaining. A viewer may see a goal live. As the viewer is witnessing the goal, the rapid recap system 112 can be interpreting the processing feed 110 that includes the goal. After identifying the characteristics from within the processing feed 110 that indicate a goal as the moment type, the rapid recap system 112 can create a clip that represents a moment of the event. The rapid recap system 112 can then create a moment marker 118 on the presenting device 114 that can be interacted with to cause the clip to be shown on the presenting device 114.

The rapid recap system 112 may receive and store event data interpreted from the video data, audio data, and metadata from the broadcast 106 separately from any moment. For example, the rapid recap system 112 may receive a processing feed 110 and may interpret data regarding the event 104 of the broadcast 106. The event data may be stored in a file or other searchable database that can be accessed by the rapid recap system 112 upon a determination the rapid recap system 112 involves the data. The data can include, for example, an identification of players that have played in the game (including their names, numbers, and time on the field), a number of goals scored, a player credited with scoring a goal, number of penalties issued, types of penalties issued, potential penalties, number of free kicks, number of corner kicks, number of shots on goal, etc. The rapid recap system 112 may further have access to a remote database including data associated with the event but that is not from the event broadcast.

The rapid recap system 112 can process and store data that is then utilized using the natural language processor 122. In some embodiments, a user may make a user request 120 to view data or moments stored within the rapid recap system 112. The user request 120 may be a natural language command that involves interpretation to retrieve the proper data and/or moments from the rapid recap system 112. In some embodiments the user request 120 may be input via an audio recording device such as a microphone in which the natural language processor 122 may be used to translate the audio speech to text speech. In some embodiments the user request 120 could be completed using a list of options to select from at an input device. The natural language processor 122 may be used to interpret the selected options to determine what should be retrieved from the database within rapid recap system 112. In some embodiments, the user request 120 may be input using a text input device such as a keyboard. The natural language processor 122 may be used to interpret that natural language command from the text to determine what is to be retrieved from the database.

The natural language processor 122 may be configured to (1) extract a natural language command from the user request (e.g., convert audio speech into text); (2) identify the data the user requests (e.g., determining a moment type or keyword); (3) identify a presentation type; and (4) create a retrieval message that can be interpreted by the rapid recap system 112 to retrieve the requested data and compile the data into the requested format. For example, the natural language processor 122 may receive a user request from a microphone such as, "Show me the Team 1 goals." The natural language processor 122 can convert the speech to a text. Next, the natural language processor 122 can identify the data the user requests by identifying keywords. The moment metadata or moment type described by the keyword indicates the user wishes to see "goals." The natural language processor 122 can process the natural language command to determine the presentation type. In the example, the user requests to be "shown" the goals. Interpretation of the natural language command by the natural language processor 122 can indicate the user wants to watch the moments that include the goals by Team 1. The natural language processor 122 can then create a request for the rapid recap system 112 that the rapid recap system 112 can utilize to search for and combine all moments that show Team 1 goals from the event 104. In some embodiments, a user request may instead request a different presentation type such as by saying, "How many goals has Team 1 scored?" The presentation type may be interpreted by the natural language processor 122 to be a text or audio output that simply lists the number of goals scored rather than shows the moments in which the goals were scored.

The natural language processor 122 may be configured to identify a phrase within the natural language command that can be interpretated to identify a keyword. For example, as shown above, a user could request the system "Show all Athlete 1 penalties" to see all penalties committed by Athlete 1. The system, without additional interpretation, can use "Athlete 1" as a keyword to identify all moments that include Athlete 1 as indicated by the data associated with the clips. Alternatively, the natural language command can first identify the request is addressing a specific player by identifying that the request includes a name. In some embodiments, the natural language interface can cause the system to identify the jersey number of Athlete 1 to be used as a keyword to identify the moment clips in which the player appears.

In some embodiments, a natural language command can include one or more conditions. For example, a natural language command may include a first condition and second condition which can be interpreted by the natural language processor 122 to retrieve the appropriate data. A condition of a natural language command may be a portion of the natural language command that identifies a type or a characteristic of data to be retrieved that would satisfy at least the portion of the natural language command. One condition of a natural language command may be dependent on another condition of the natural language command, such that if one condition is present in the natural language command, the natural language processor 122 may interpret the condition to identify the other condition. As an illustrative example, a user could request to see "red cards committed by forwards." A first condition could be "forwards" which can be interpreted to identify specific players that play a certain position on the field. The second condition may be clips that include both the players identified as forwards and red cards. An additional condition may be present, as stated above, that filters out any clip in which a forward did not commit a penalty.

The natural language processor 122 can process the speech recognition results to extract or identify keywords. For example, a user via the user device 102 can transmit keywords to the rapid recap system 112 (e.g., the interactive event broadcast system 100 can make an application programming interface (API) call to the rapid recap system 112 providing one or more keywords). As another example, the natural language processor 122 can be trained to identify keywords using a corpus of text that includes people, places, and/or events. As another example, keywords may be statistically improbable phrases, and the natural language processor 122 can be trained to identify such statistically improbable phrases using a corpus of text (e.g., a corpus of literary works, news articles, journal papers, television or move scripts, and/or the like). The natural language processor 122 can store received keywords and/or keywords derived from training in a database (not shown) internal to the natural language processor 122.

Optionally, the natural language processor 122 can be used by the rapid recap system to identify characteristics of the video data and the audio data. For example, the natural language processor 122 can extract keywords from closed captioning information provided as part of the broadcast feed 108. For example, the broadcast feed 108 may include closed captioning text in one or more languages. The natural language processor 122 can extract the closed captioning text from the audio data and the video data and parse the closed captioning text to extract or identify keywords in a manner as described above with respect to the speech recognition results. Keywords identified in the closed captioning text can be stored by the natural language processor 122 in a table associated with the broadcast 106 or within the database of the rapid recap system 112 and in an entry associated with the time of the broadcast 106 from which it was pulled. Further, the natural language processor 122 can be utilized to interpret the audio data to determine characteristics within the audio data that may indicate a moment.

The presenting device 114 can receive the result 124 of the fulfillment of the request sent to the rapid recap system 112 and the broadcast feed 108 from the broadcast 106. The result 124 from the rapid recap system 112 can be configured to be presented simultaneously with the broadcast feed 108 or can be presented on the presenting device 114 instead of the broadcast feed 108. The broadcast feed 108 can continue to play the live event broadcast until a request from the user causes the rapid recap system 112 to populate another display image. In some embodiments, the result 124 can be configured to present on a less or least intrusive portion of the broadcast feed 108 (e.g., on a portion of the broadcast feed 108 that does not hide the action or event being depicted in the broadcast feed 108 or that hides a percentage of the action or event being depicted that is less than a threshold percentage (e.g., 5%, 10%, etc.)). In some embodiments, the rapid recap system 112 (or another component) could analyze the event broadcast and identify portions of the event broadcast that do not change often (e.g., pixels corresponding to certain portions of the event broadcast do not change color for a threshold period of time or happen to be the same color for X % of a threshold time period). The portions of the event broadcast for which the pixels do not change color for at least a threshold period or percentage of time could represent portions of the UI that are less intrusive. For example, if there is a portion of the broadcast feed 108 merely showing empty portion of a soccer field, the result 124 may presented there as to not interrupt the broadcast feed 108 or prevent a user from watching the more important aspects of the game being presented live.

The presenting devices 114 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual presenting devices 114 may execute a media player to playback broadcast feeds 108 and/or a browser application or a standalone application that allows a user to request moments or make requests for data from the interactive event broadcast system 100.

The rapid recap system 112 can be a computing system programmed or otherwise configured to identify data and moments as described herein. The rapid recap system 112 may process a video data and audio data to create moments or assemble data when the as the processing feed 110 is received, when the system receives a user request 120, and/or any combination thereof.

The rapid recap system 112 and/or the natural language processor 122 of FIG. 1 may be a single computing device or may include multiple distinct computing devices, such as computer servers, logically or physically grouped together to collectively operate as a server system. The components of the rapid recap system 112 and/or the natural language processor 122 can each be implemented in application-specific hardware (e.g., a server computing device with one or more ASICs) such that no software is necessary, or as a combination of hardware and software. In addition, the modules, and components of the rapid recap system 112 and/or the natural language processor 122 can be combined on one server computing device or separated individually or into groups on several server computing devices. In some embodiments, the rapid recap system 112 and/or the natural language processor 122 may include additional or fewer components than illustrated in FIG. 1.

In some embodiments, the features and services provided by the rapid recap system 112 and/or the natural language processor 122 may be implemented as web services. In further embodiments, rapid recap system 112 and/or the natural language processor 122 are provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

It should be appreciated the event 104 of the event broadcast is described herein as being a soccer match for illustrative purposes and ease of explanation, but this is not meant to be limiting. For example, the event 104 can be other sporting and non-sporting events that include identifiable moments that can be extracted from video data and audio data of a broadcast. The functionality described herein can be performed on event broadcasts that depict different types of live or recorded events 104, including sporting events (e.g., American football, basketball, baseball, ice hockey, soccer, tennis, golf, etc.), concerts, game shows, awards shows, news broadcasts, political debates, etc.

Example Block Diagram for Generating a Media Segment Index

Figure 2:
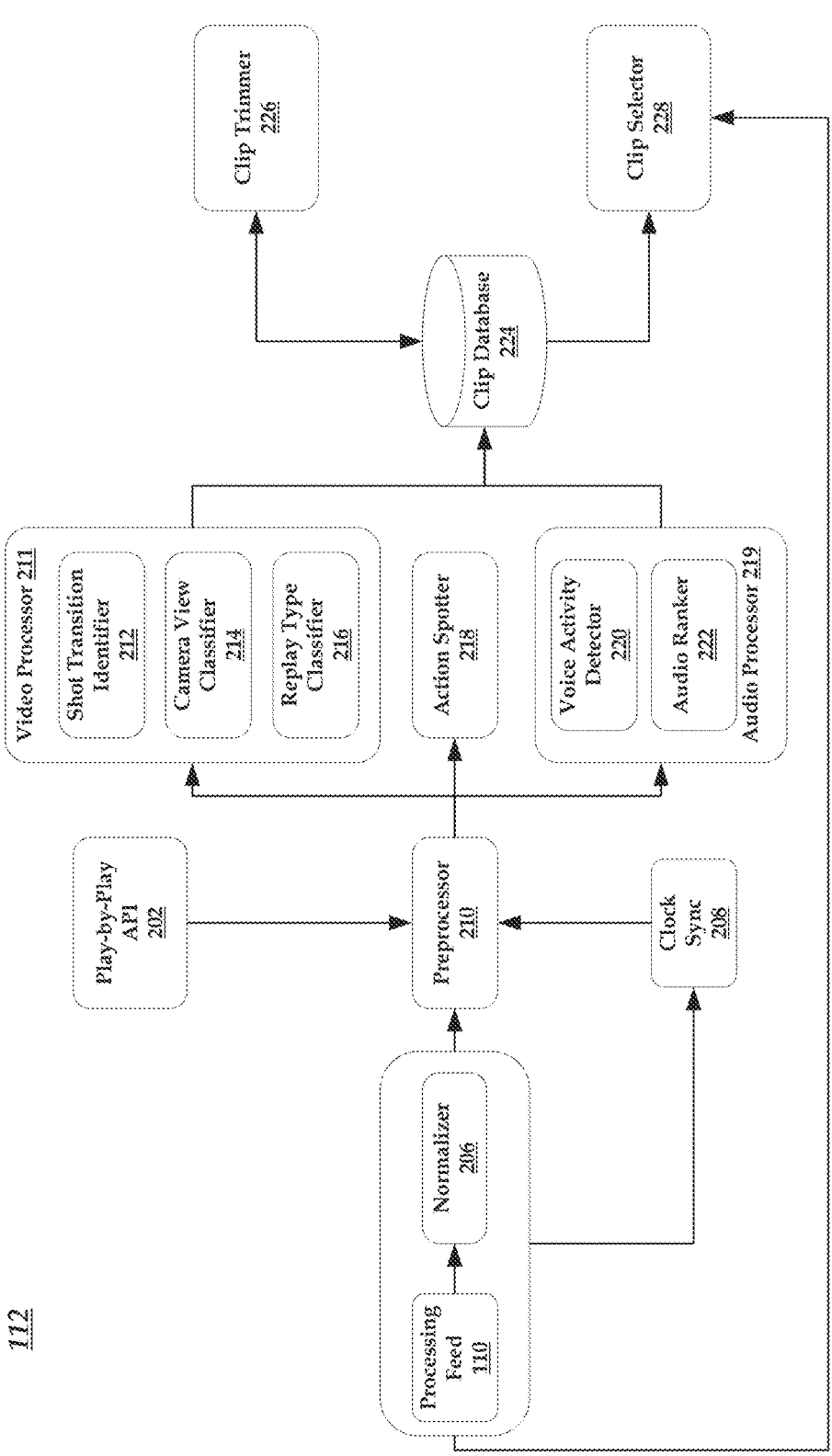
FIG. 2 is a block diagram of the rapid recap system of FIG. 1 illustrating the operations performed by the components of interactive event broadcast system environment to generate event moments, according to one embodiment.

FIG. 2 is a block diagram of the rapid recap system 112 of FIG. 1 illustrating the operations performed by the components of the rapid recap system 112 to generate event highlights as moment clips and moment reels, according to one embodiment. As illustrated in FIG. 2, the rapid recap system 112 receives a processing feed 110 of a broadcast 106 as shown in FIG. 1. The rapid recap system 112 may normalize the processing feed 110 using a normalizer 206. The normalizer 206 can normalize the audio data to adjust audio levels, limit audio level peaks, compress the audio, equalize the audio, etc. The normalizer 206 can further normalize the video data to adjust brightness and contrast, correct color, and saturation, ensure consistent frame rate and resolution, adjust aspect ratio, etc. Normalizing audio data and video data can ensure that processing the audio data to identify characteristics as discussed herein is accurate to determine and rank moments. Further, the normalizer 206 can, in some embodiments, compress the processing feed 110 into a file that is usable by the rapid recap system 112 to identify moments.

As part of the normalization, the normalizer 206 provides the normalized feed to a clock sync 208. The clock sync 208 can be utilized to synchronize the time of the processing feed 110 with a detected event clock. For example, if the event is a soccer match, the clock sync 208 can be used to detect the presented game clock of the soccer match and attach the game clock time as part of the normalized processing feed. The game clock time can be utilized to provide game times for the identified moments and event data. For example, if a moment type for a moment indicates the moment is a goal, the rapid recap system 112 can use the game clock time to provide a user with the exact time within the game the goal was scored. Further, game clock times can be used to rank moments. For example, if a moment occurs towards the end of a regulation time, the moment may be more important and may be ranked higher. For example, a goal scored as the time is approaching half-time or the end of the game may be more impactful on the overall event than a goal scored at minute 30.

The clock sync 208 data and the normalized feed from the normalizer 206 can be provided to the preprocessor 210. The video and audio data within the preprocessor 210 can be processed by a play-by-play application programming interface (API) 202. The play-by-play API 202 can review the normalized feed to identify and provide event data regarding the event. In some embodiments, the play-by-play API 202 further processes the normalized audio and video data. In some embodiments, the play-by-play API derives detailed event data that occurred at various times within a game. Event data can include data identifying individual actions within the event, such as an injury or scoring play. Event data can further include timestamps, player and team data, statistics, real time updates, historical data, etc. The play-by-play API data can be used to help identify a moment within the event by categorizing actions as moment types. This data can be stored in the clip database 224 alongside the video and audio data or in another database to be used to respond to user requests 120 as shown in FIG. 1.

The preprocessed video and audio data can be provided to a video processor 211 and an audio processor 219, respectively. The components of the video processor 211 and the audio processor 219 are depicted as being dedicated to interpreting one of visual or audio data, but, in some embodiments, the components could be configured to interpret video and audio data. The video processor 211 can be configured to utilize components to interpret the video data to identify data and moments and to process the video data to be trimmed and/or combined into a moment or a moment reel. The shot transition identifier 212 can detect transitions between shots, e.g., changing from one capture device 102 capture to another. Such shot transitions can be indicative of the start of a moment or the end of a moment. For example, a shot transition may occur just before a goal to a capture device 102 that faces the goal rather than captures the profile of the goal. A shot transition may also occur to show the entire field for a kickoff after a goal has occurred, indicating the moment of the goal is over.

The shot transition identifier 212 can utilize computer vision and/or machine learning to analyze the video data. The video data may include metadata that indicates the capture device 102 used during any given frame of the video data. The shot transition identifier 212 can extract key features from the video data, such as a goal or full field as described above. Certain events may regularly transition between capture devices 102 predictably at key moments of an event. The shot transition identifier 212 can utilize a machine learning model that is the trained shot transition identifier to predict a moment based on the shot transition. For example, the machine learning model may be trained using training data that includes various clips (e.g., video data portions) each with one or more shot transitions (e.g., where the shot transitions may be noted based on metadata indicating the capture device 102 used during any given frame) and that are each labeled to indicate the beginning and/or end of a moment. The shot transition identifier 212 can provide the video data (and the corresponding metadata) as an input to the trained machine learning model, which causes the trained machine learning model to output an indication of a beginning time and/or ending time of a moment. Further, the shot transition identifier 212 could be configured to detect transitions, such as a cut, fade, or dissolve using pixel analyzing techniques.

A camera view classifier 214 can classify the camera type and angle used as the capture device 102. The camera view classifier 214 can examine visual characteristics such as viewpoints pixel clarity to determine camera view. The viewpoint may be defined by examining the visual features such as objects, patterns, texture, color, etc. For example, the camera view classifier 214 may use the orientation of the lines on a soccer pitch to determine the angle the capture device is viewing. The camera view classifier 214 would determine that the lines on a pitch are straight and if lines within the camera view are angled, the camera is at a viewpoint that is calculable. As mentioned above, depending on the camera view, the rapid recap system 112 may determine the capture device 102 is capturing a moment. The camera view classifier 214 can utilize a machine learning model that is trained by the camera view classifier 214 to predict a moment based on the camera view. For example, the machine learning model may be trained by the camera view classifier 214 or another component (not shown) using training data that includes various clips (e.g., video data portions) each with one or more camera view (e.g., where the camera view may be noted based on metadata indicating the camera view orientation at the field used during any given frame) and that each are labeled to indicate the beginning and/or end of a moment and the moment type. Using machine learning training data, the camera view classifier 214 can be trained that certain capture device 102 views and capture device 102 quality can indicate moments for certain events.

A replay type classifier 216 may be used to detect a replay and determine a main action in a replay. Using detection techniques such as camera type, shot transition, and reading metadata, the replay type classifier 216 may interpret a portion of the processing feed 110 to be a replay. It is common for a replay to indicate a moment that is of interest within the event 104. For example, a replay will be used to show an injury or the moment of impact for a penalty. Using machine learning and computer vision, the replay type classifier 216 can be trained to detect and classify the action within the replay. The replay type classifier 216 can utilize a machine learning model that is the trained by the replay type classifier 216 to predict a moment based on the visual characteristics of a clip that occur when the clip includes a replay. For example, the machine learning model may be trained by the replay type classifier 126 or another component (not shown) using training data that includes various clips (e.g., video data portions) each with at least one replay (e.g., where the video data portion is a video portion that has previously been shown and is reshown as part of a broadcast) and that each are labeled to indicate the beginning and/or end of a moment and the moment type. For example, the model may be trained to identify metadata that indicates the video stream is a replay, visual characteristics that indicate the video stream is a zoomed in or in slow motion, that there are graphical indicators such as drawn circles to identify key actions of the moment, etc.

An action spotter 218 can be used as part of the video processor 211 or independently of the video processor 211 or the audio processor 219 to spot an action or a moment within the processing feed 110. The action spotting module can be utilized by the replay type classifier 216 to spot the action to be classified or can be used on the processing feed 110 that is not part of the portion that constitutes a replay. The action spotter 218 can use visual characteristics and/or audio characteristics and machine learning training to detect actions. The action spotter 218 can utilize a machine learning model trained by the action spotter 218 to predict a moment based on the visual characteristics and/or audio characteristics that indicate actions of the event within a clip. For example, the machine learning model may be trained by the action spotter 218 or another component (not shown) using training data that includes various clips (e.g., video data portions) each with one or more characteristic and/or action identified (e.g., where the video data portion includes an action such as a kick, penalty, goal, etc.) and that each are labeled to indicate the beginning and/or end of a moment and the moment type based on the identified action.

In some embodiments, the action spotter 218 may be trained to perform any actions that can be performed by the play-by-play API 202. The action spotter 218 can be used with or in place of the play-by-play API 202 as a redundant check to ensure accurate event data detection.

The video processor 211 can use one or a combination of the components described above to identify visual characteristics from the video data. The video data and the visual characteristics can be stored in the clip database 224.

The audio processor 219 can receive the preprocessed audio data from the preprocessor. The audio processor 219 can utilize audio modules to interpret the audio data to determine moments or auditory characteristics from the audio data. Components could include a voice activity detector 220 and/or an audio ranker 222. The voice activity detector can detect silence moments. Silent moments can indicate a moment has completed, or there is a natural break in the sound that could indicate a moment in the audio feed that would be better suited for a clip to be trimmed. Silence can be detected using noise level monitoring, audio signal amplitude analysis, voice activity detection (VAD) algorithms, etc. The audio ranker 222 can indicate audio levels to be used to rank moments of the event. For example, if the audio ranker 222 determines the audio increases during the processing feed 110 at a first time and increases more at a second time later in the processing feed 110, the audio ranker 222 may rank the second time higher than the first time. The rankings may be used to determine the significance of moments that occur at the first and second times. Further, the audio ranker 222 may monitor the length of the increase in audio to determine two or more timestamps that indicate the duration of the audio increase. The outputs of the voice activity detector 220 and the audio ranker 222 can be stored in the clip database 224 alongside the audio data or in another database.

In some embodiments, some or all components of the video processor 211 and the audio processor 219 can utilize both video and audio data. The audio data and the video data can be stored in the clip database 224. The clip trimmer 226 can pull the audio data and the video data from the clip database 224 along with any other data stored in the clip database 224 or another database. The clip trimmer 226 can utilize the stored information to determine moments of the event 104 within the processing feed 110 and can trim the associated audio data and video data to create a clip. The clip can include a highlight of the event. The clip trimmer 226 can utilize all the data as previously described to determine the length of the portion of the processing feed 110 to include in the clip. For example, the clip trimmer 226 can utilize moment metadata and/or the moment type as identified by the play-by-play API 202 to determine where in the processing feed 110 a moment exists. Because the audio data and video data were synchronized using the clock sync 208, the clip trimmer 226 may identify when the moment metadata and/or the moment type as defined by the play-by-play API occurs. Using the clock time, the clip trimmer 226 can utilize information from the video processor 211 and the audio processor 219 to trim the clip to appropriately capture the moment. For example, audio data from the audio ranker 222, can be used to determine where the moment begins and ends based on the increase in volume and the voice activity detector 220 can be used to create the endpoints of the clip so as to not interrupt voices within the audio such as a commentator. Video data can be used to determine where the replays were detected by the replay type classifier 216 to prevent replays from being included in clip.

Further, data from the video processor 211 and the audio processor 219 can be used to ensure moments are detected and are detected accurately by the play-by-play API 202. For example, if the audio ranker 222 detects an increase in volume at a time the play-by-play did not identify an action that could be classified as a moment type, there may be a moment at the time. The clip trimmer can utilize the audio ranker 222 data as an indicator of a moment and can review the other data at that time to determine if there is a moment. Further, the play-by-play API 202 may detect an action and classify the action as a moment when in fact the action occurred as part of a replay. Using the replay type classifier 216 data, the clip trimmer 226 can determine there is no need to create a clip as there is no moment.

The use of the data from play-by-play API 202, video processor 211, and audio processor 219 as described above are not limited to the examples listed. The data can be used in any manner by the clip trimmer 226 to detect and validate moments within the event 104 of the processing feed 110. The data may also be utilized to trim the clip to encapsulate the moment adequately.

The clip trimmer 226 can store the clips in the clip database 224. The clip selector 228 may utilize the clips and the data to create moment reels. Moment reels can include two or more clips combined to create, for example a narrative or overview of the event 104. For example, a moment reel may include all key plays such as goals and penalties. In some embodiments, to determine what clips to include in a moment reel, the clip selector 228 may select clips based on moment metadata and/or a moment type, e.g., all goals, chronologically, by player, or by rankings. As described above, the audio ranker 222 can rank the audio to help determine moment significance based on audio levels. The clip selector 228 may rely on the audio ranker 222 or may use the ranking from the audio ranker 222 to create a new ranking. For example, the clip selector 228 may include moment type, clock sync time, key players within the moment, number of replays detected for the moment, etc. Further, the clip selector 228 can be trained using a training set to determine which moments should be ranked higher than others. The clip selector 228 may then determine an order to combine the ranked moments.

The clip selector 228 may use video data and audio data that is not part of any clip in the moment reel to create a more cohesive moment reel. For example, if a first moment type was identified to be a potential, but not called, penalty by the play-by-play API 202, audio ranker 222, and the replay type classifier 216, and a second moment occurring shortly after the first moment was identified to be a goal, the clip selector may include the video data and audio data that occurred between the first moment and the second moment between the moments in the moment reel. By including the additional data, the clip selector provides a more comprehensive view of the moments of the game and how the moments were connected.

Example Block Diagram for Completing a User Request

Figure 3:
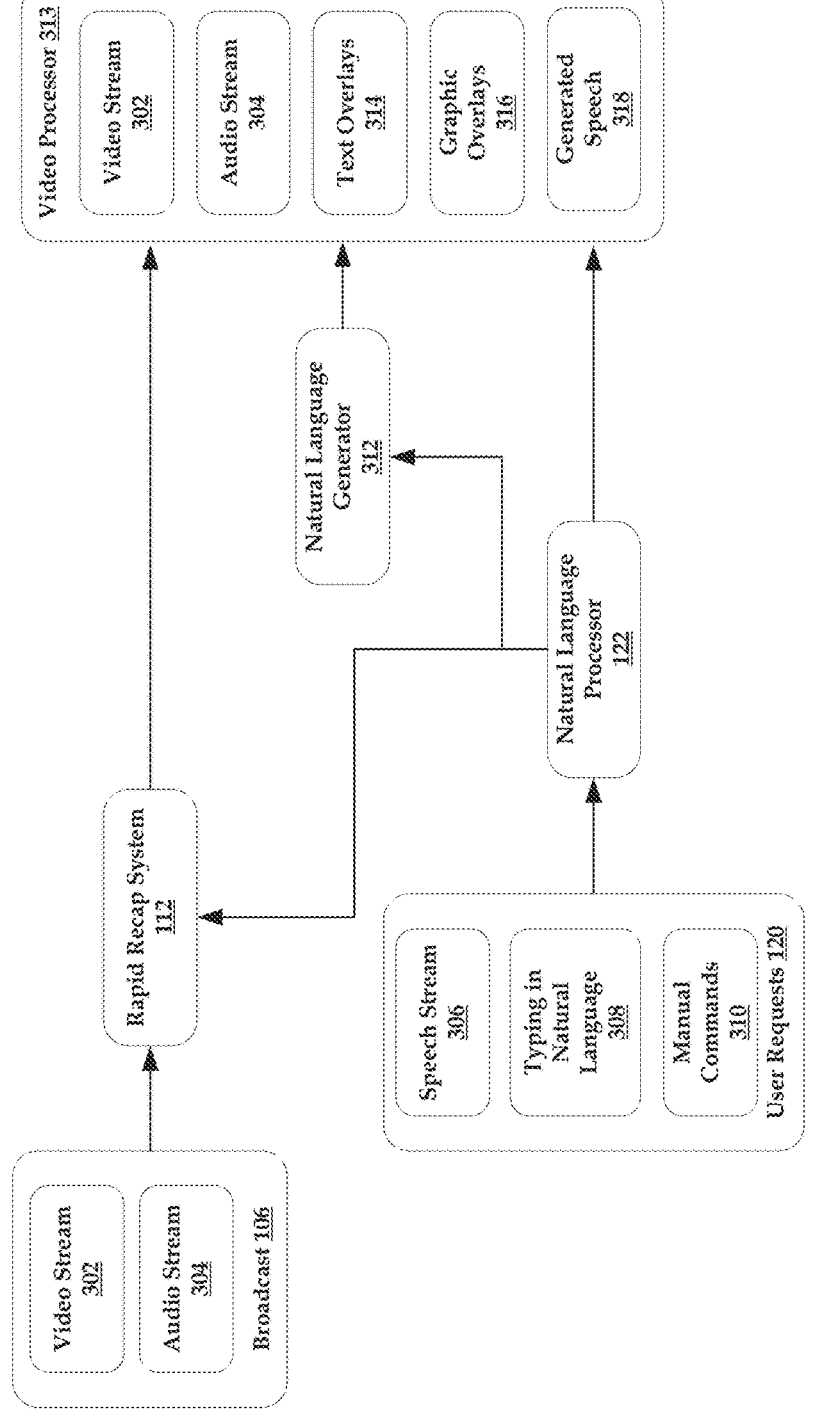
FIG. 3 is a block diagram of an event broadcast natural language interface environment of FIG. 1 illustrating the operations performed by the components of the interactive event broadcast system environment to receive and interpret requests for data related to the event broadcast, according to one embodiment.

FIG. 3 is a block diagram of an event broadcast natural language interface environment 300 of FIG. 1 illustrating the operations performed by the components of the interactive event broadcast system environment 100 to receive and interpret requests for data related to the event broadcast, according to one embodiment. As illustrated in FIG. 3, a user request 120 can be received by the event broadcast natural language interface environment 300 and be translated by the natural language processor 122. The user request 120 can include one or more of a speech stream 306, typing in natural language 308, and/or manual commands 310. As described above, in some embodiments the speech stream 306 may be input via an audio recording device such as a microphone in which the natural language processor 122 may be used to translate the audio speech to text. The speech to text translation can be done using automatic speech recognition (ASR) using APIs, open-source engines, and through machine learning speech to text translators. In some embodiments, the input speech can be transcribed by the natural language processor 122 or a component of the video processor 313. The transcribed input speech can be presented to the user to allow the user to determine if the natural language processor 122 accurately captured and interpreted the speech input. In some embodiments, the user request 120 may be input using a text input device such as a keyboard to create typing in natural language 308. In some embodiments user request 120 could be completed using a list of options provided to the user to select at an input device using manual commands 310. The natural language processor 122 may be used to interpret the selected options to determine what should be retrieved from the database within rapid recap system 112. The natural language processor 122 may be used to interpret that natural language command from the text to determine what is to be retrieved from the database.

The natural language processor 122 may be configured to (1) extract a natural language command from the user request (e.g., convert audio speech into text, determine which manual commands were selected); (2) identify the data the user requests (e.g., determining an moment type or keyword); (3) identify a presentation type; and (4) create a retrieval message that can be interpreted by the rapid recap system 112 to retrieve the requested data and compile the data into the requested format. For example, the natural language processor 122 may receive a user request from a microphone such as, "Show me the Team 1 goals." The natural language processor 122 can convert the speech to a text using the above mentioned and other speech to text translation methods.

Next, the natural language processor 122 can identify the data requested in the user request 120. To identify the data requested, the natural language processor 122 can review the natural language command to identify and extract keywords that could indicate a moment type or other moment metadata that further limits the request. Returning to the example, the first keyword that describes the moment type is "goals" and the second keyword is "Team 1." The natural language processor 122 could then conclude the user wants to retrieve all the goals in which the data indicates the scorer was Team 1. The natural language command can further be interpreted to determine the presentation type. In the example, the user requests to be "shown" the goals. Interpretation of the natural language command by the natural language processor 122 can indicate the user wants to watch the moment clips that include the goals by Team 1. The natural language processor 122 can then create a request for the rapid recap system 112 that the rapid recap system 112 can utilize to search for and combine all moments that show Team 1 goals from the event 104. In some embodiments, a user request may instead request a different presentation type such as by saying, "How many goals have Team 1 scored?" The presentation type may be interpreted by the natural language processor 122 to be a text or audio output that simply lists the number of goals scored rather than shows the moments in which the goals were scored.

The natural language processor 122 may detect more than one type of data described by the identified keywords, for example "goals" and "penalties," but may be trained to determine if more than one moment type is requested and determine which of the keywords identifies the moment type. For example, the user may request to see, "All goals resulting from penalties." While the keywords may indicate both moment types, the natural language processor 122 may processes the request to determine the user wants to be shown the goals, but only the goals that came subsequent to penalties.

Additionally, the natural language processor 122 may detect a word or phrase that requires additional processing or translation. For example, if a request includes a player's name, such as, "Athlete 1," the natural language processor 122 may identify that the phrase is a name that indicates a player. The player's name may or may not be stored as part of the data associated with moments and moment clips in the database. If player names are not used as identifying data for moment clips, the natural language processor 122, may further translate "Athlete 1" into a player number or other identifying keyword that is used within the rapid recap system 112 to identify moment clips. Additional examples can include slang terminology such as "fouls" to indicate a penalty or "1" to indicate Team 1. The natural language processor 122 may, in some embodiments, identify a player from a position name. For example, a request may include a position title such as "striker." The natural language processor 122 can identify which players are playing striker either by name or by a player number to retrieve clips.

The natural language processor 122 can further apply speech recognition to interpret data for the rapid recap system 112. Using the audio data or captions, the natural language processor 122 can extract or identify keywords that can be used to provide context for moments or identify moments. Optionally, the natural language processor 122 can be used by the rapid recap system 112 to identify visual and auditory characteristics of the video data and the audio data. For example, the natural language processor 122 can extract keywords from closed captioning information provided as part of the broadcast feed 108. For example, the broadcast feed 108 may include closed captioning text in one or more languages. The natural language processor 122 can extract the closed captioning text from the audio data and the video data and parse the closed captioning text to extract or identify keywords in a manner as described above with respect to the speech recognition results. Keywords identified in the closed captioning text can be stored by the natural language processor 122 in a table associated with the broadcast 106 or within the database of the rapid recap system 112 and in an entry associated with the time of the broadcast 106 from which it was pulled. Further, the natural language processor 122 can be utilized to interpret the audio data to determine characteristics within the audio data that may indicate a moment.

The natural language processor 122 can be trained to identify keywords using a corpus of text that includes people, places, and/or events. As another example, keywords may be statistically improbable phrases, and the natural language processor 122 can be trained to identify such statistically improbable phrases using a corpus of text (e.g., a corpus of literary works, news articles, journal papers, television or move scripts, and/or the like). The natural language processor 122 can store received keywords and/or keywords derived from training in a database (not shown) internal to the natural language processor 122.

After translating the natural language command, the natural language processor 122 can send instructions or translated keywords to the rapid recap system 112 to provide the rapid recap system 112 with instructions to retrieve data. The rapid recap system 112 can use the data and clips in the clip database 224 to create a media representation, such as a graphical representation (e.g., image, animation, video, text, etc.) of the data requested, an audio representation (e.g., spoken words output via a speaker) of the data requested, and/or the like. For example, if the user requests to be shown the moment metadata, such as one or more moment types, the rapid recap system 112 can collect the relevant clips of the moment type from the clip database 224 and can combine them at the clip selector 228 as described above. For example, if the user requests to be provided information in a text or speech format, the rapid recap system 112 can collect the relevant information and provide the relevant information to video processor 313 that utilizes the natural language generator 312 to create the media representation before presenting the text information to the presenting device 114. In some embodiments, the natural language processor 122 can be trained to recognize multiple languages. The natural language processor 122 can accept the natural language command from a first language and translate the natural language command into a second language that is used to store metadata of the event broadcast. For example, an event broadcast can be from a source that utilizes English. Words on the screen, announcer broadcast language within the audio stream, and other such data may be captured and stored in English. The natural language command may be input in Spanish. The natural language processor 122 can interpret the natural language command into English to retrieve the requested data and can translate any requested data into Spanish to be presented to the user. The video processor 313 can be a processor that is provided data retrieved using the play-by-play API 202, video processor 211, and audio processor 219. The video processor 313 can be used to create video presentations to be provided to the presenting device 114 based on the user request 120.

The video processor 313 can receive the video stream 302 and the audio stream 304 of the broadcast 106, the data, and the clips. Using the determined presentation type, the video processor 313 can create the media representation of the desired information. For example, the video processor may simply receive the moment reel from the clip selector 228 that was created based on the user request 120 and transmit it to the presenting device 114 instead of the broadcast feed 108. The video processor 313 may create a table or natural language sentence (using, for example, the natural language processor 122 to create a natural language interpretation of the data) and create a text overlay 314 using the natural language generator 312 to present on the video stream 302.

In some embodiments, the user request 120 may use a geometric indicator to be populated on the video stream 302. For example, if the user request 120 is, "Show me who has the ball," the video processor 313 will create a graphical overlay 316 to indicate the ball on the video stream 302 found using the rapid recap system 112.

In some examples, the user request 120 may indicate the user wants an audio response such as, "How many goals has Team 1 Scored?" The video processor 313 may receive the number of goals found in the data from the rapid recap system 112 and may generate speech 318 to play over, or in place of the audio stream 304.

Example Event Broadcast Interpretation Routine

Figure 4:
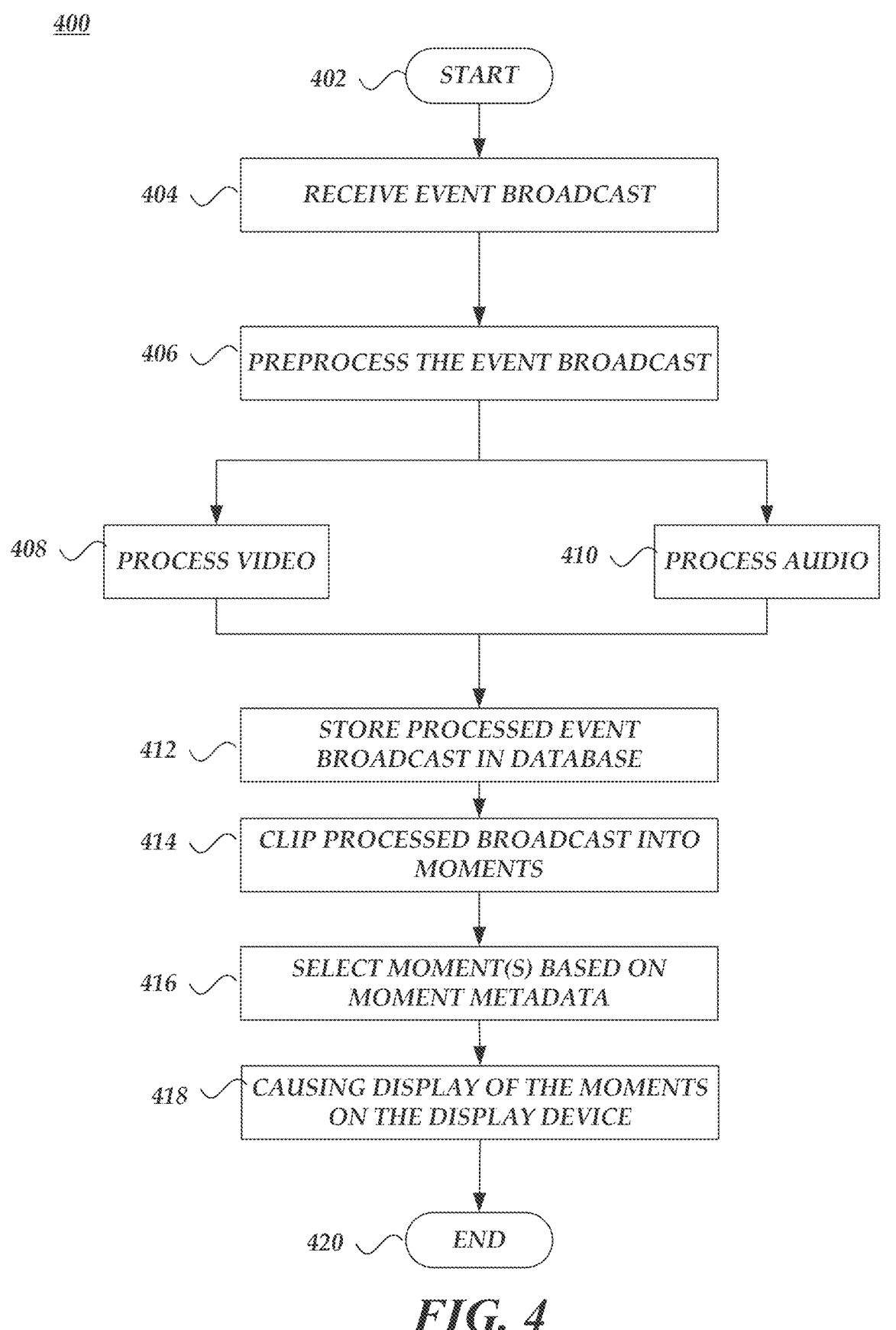
FIG. 4 is a flow diagram depicting a routine for collecting and interpreting event broadcast data according to the rapid recap system of FIG. 2, according to one embodiment.

FIG. 4 is a flow diagram depicting a routine for collecting and interpreting event broadcast data 400 according to the rapid recap system 112 of FIG. 2, according to one embodiment. As an example, the rapid recap system 112 of FIG. 2 can be configured to execute the event broadcast interpretation routine 400. The event broadcast interpretation routine 400 begins at block 402.

At block 404, an event broadcast is received. The event broadcast can include video data and audio data that can be a portion of the event broadcast that extends from a first time to a second time or can be the entire event broadcast that has been received by the rapid recap system 112, where the second time is the most recently broadcasted time of the event broadcast. The event broadcast is then preprocessed at block 406 to collect moment metadata such as by identifying characteristics and/or actions for the event 104 shown in the event broadcast and identifying actions that constitute moment types. A characteristic can be an action, such as a penalty, or can be other identifiable information regarding the event 104, such as team names, player numbers, etc. The action can be classified by the play-by-play API 202 as a moment type, such as a "pass" or can simply be an action, such as a player kicking the soccer ball or dribbling the soccer ball.

At blocks 408 and 410 the video data and audio data of the event broadcast are processed using the video processor 211 and audio processor 219 of FIG. 2, respectively. The processing is completed using video and audio processing components that identify characteristics and create data to be stored in a clip database at block 412. The video processor 211 can identify a visual indicator that can be a characteristic that indicates a moment. The audio processor 219 can identify an auditory indicator that can be a characteristic that indicates a moment. The characteristics can be stored as moment metadata or can be used by the components to identify moment types within the portion of the event 104. To determine a moment, the rapid recap system 112 can use the moment indicated by the action from the play-by-play API 202, the visual indicator, and/or the auditory indicator occurring at a time to determine a moment. In some embodiments, there may be only one or two of a play-by-play API 202 action, a visual indicator, and an auditory indicator. In such situations, the rapid recap system 112 can determine if a moment occurs and what type of moment occurs. In some cases, the auditory indicator may indicate a goal at a time and the visual indicator indicates a replay at the time. The rapid recap system 112 may then determine there is no moment at the time.

The identified characteristics and moment types used to identify a moment are used to clip the broadcast at block 414. Trimming the broadcast into a clip can include determining a first time and a second time of the broadcast that includes the moment between the first time and the second time. In some embodiments the auditory indicator and the visual indicator can happen at a same time between the first time and the second time, or at different times between the first time and the second time. The first time and the second time can further encapsulate actions and characteristics that lead up to the action that is the moment. For example, the moment type can indicate the action in the moment is a "goal." The portion included within the first and second times can include passes leading up to the goal and celebrations after the goal.

One or more clips are identified to be combined into a moment reel based on the characteristics and moment types of the one or more clips at block 416. A moment reel can further include video data and audio data of the broadcast that is not included in a clip to provide a full context of the moments within the moment reel. For example, a second penalty may be performed in retaliation by a player for a first penalty. The first moment clip may only show the first penalty and the second moment clip may only show the second penalty. The moment reel may show the actions between the penalties, such as pushing and shoving of players or a bench clearing, that lead to the second penalty.

The rapid recap system then causes the moment reel to be presented at the presenting device 114 at block 418. The event broadcast interpretation routine 400 ends at block 420.

Example Interpreting and Completing Requests Routine

Figure 5:
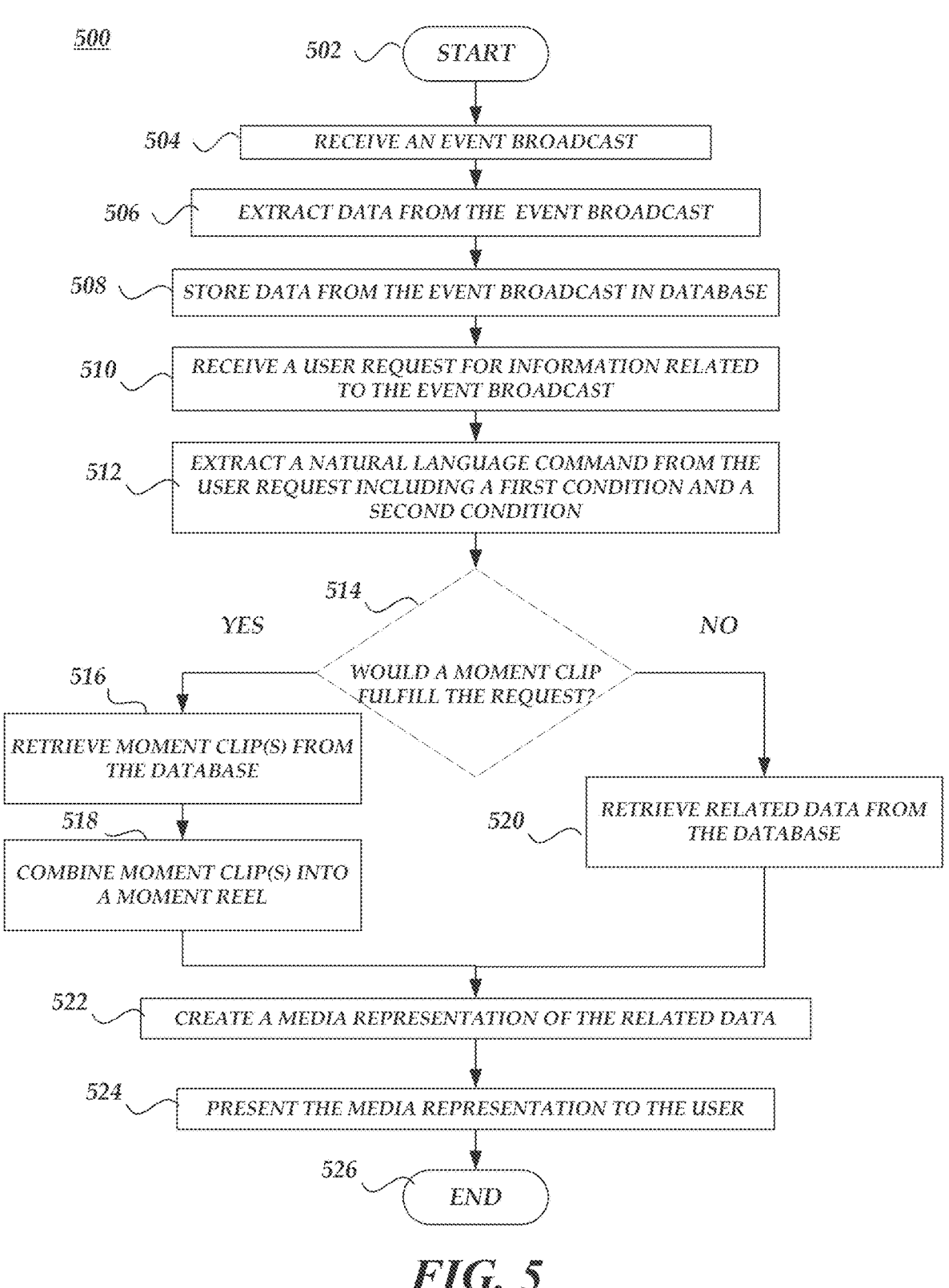
FIG. 5 is a flow diagram depicting a natural language command interpretation routine illustratively implemented by the event broadcast natural language interface environment of FIG. 3, according to one embodiment.

FIG. 5 is a flow diagram depicting a natural language command interpretation routine 500 illustratively implemented by the event broadcast natural language interface environment 300 of FIG. 3, according to one embodiment. The natural language command interpretation routine 500 begins at block 502.

At block 504, an event broadcast is received. Moment metadata is extracted from the event broadcast at block 506 including moment type(s) and characteristics that are identified from audio data and video data from the event broadcast. The moment type(s) and characteristics can be identified by the preprocessor 210 and the video processor 211 and audio processor 219 of FIG. 2.

The moment metadata, including the moment type(s) and characteristics, is stored in a database which can be the clip database 224 of the rapid recap system 112 with the audio stream and the video stream of the broadcast at block 508.

A user request 120 is received at block 510. The user request is a request for information and/or data related to the event broadcast. As described above, the request can be for characteristics, clips, and other information regarding the event broadcast.

At block 512 the natural language processor 122 can extract a natural language command from the user request 120 and determine from the natural language command what the user requested. The natural language processor 122 can determine moment metadata, such as a moment type, and a presentation type for the user request as described above.

The presentation type is used at block 514 to determine if a moment clip would fulfill the user request. Upon the determination that a moment clip would fulfill the user request, the natural language command interpretation routine 500 proceeds to block 516 and the moment clip is retrieved from the clip database 224. If more than one moment clip would fulfill the user request 120, the natural language command interpretation routine 500 proceeds to block 518 and the moment clips are combined into a moment reel. In some embodiments, the natural language processor 122 may determine a need for more information. The natural language processor 122 may then create a natural language prompt to prompt a user for more information. As an illustrative example, the user request may include "Show me his goal saves" while seeing an image of a goalkeeper on the screen. In some embodiments, the system may be able to interpret the live stream data to determine the player on the screen. In other embodiments, the natural language processor 122 may require more information to determine which "him" the user is referring to. The natural language processor 122 may create a prompt such as, "Whose goal saves would you like to see?" Or may tailor the question even more specifically by recognizing that a goal save would indicate a goalkeeper and could ask, "Which team?" When presenting data, the natural language processor 122 may provide an interpretation of the two natural language commands to provide the user an interpretation of the request such as, "Showing all goal saves by Team 1's goalkeeper, Athlete 1."

On the determination that moment clips would not fulfill the user request, the routine for receiving and interpreting requests for data related to the event broadcast 500 continues at block 520. The data that is required to fulfill the request can be retrieved from the clip database 224. In some embodiments, the request can be regarding the event broadcast, but use previous broadcast data. For example, the request can be for the number of goals a player in the soccer match has scored during the season. The rapid recap system 112 will use the data in the clip database 224 to determine how many goals, if any, the player has scored in the event. The rapid recap system 112 can then access a separate database or can have retrieved season data at the play-by-play API 202. The data accessed from the clip database 224 and/or the separate database can be a subset of the data.

At block 522, a media representation such as a graphical representation of the related data that was retrieved is created. As described above, the media representation can be created by the rapid recap system 112 or the video processor 313. The media representation can include text, generated speech, clips, moment reels, and media overlays. For example, the media representation can replace the live broadcast or can cover a portion of a screen of the presenting device 114, such that the live broadcast can still be viewed and is presenting behind the media representation. In some embodiments, the text overlay may appear over the live broadcast as words or a table, such that the live broadcast can be seen through the text. In some embodiments, the text may appear on a darkened a portion of the screen that prevents the live broadcast from interfering with a user's ability to read the text. In some embodiments, the graphical overlay may be geometric shapes superimposed on images of the live broadcast. For example, if a user request asks to be shown where the soccer ball is, an arrow or other such indictor may appear on the screen to track the soccer ball as it moves.

The media representation may be configured to appear for the duration of the time it takes a clip or a moment reel to play. In some embodiments, the media representation of a clip or moment reel may include an interactive feature that a user can interact with to stop presentation of the media representation and return to the live broadcast. For example, the media representation may be associated with a toggle switch that allows the user to hide or present the media representation as desired. In some embodiments, the media representation may appear for a time. The time may be predetermined or may be set by a user. In some embodiments, the media representation may include an interactive device to maintain the media representation on the screen until otherwise indicated or to remove the media representation from presenting on the presenting device 114. At block 524 the media representation is presented to the user at the presenting device 114. After the media representation is presented to the user, the natural language command interpretation routine 500 ends, as shown at block 526.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements, or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method comprising:

receiving data of an event broadcast over a network, wherein the data is stored in data storage accessible by a natural language processor;

prior to receiving a natural language command, normalizing the data of the event broadcast, wherein normalizing the data adjusts audio characteristics and video characteristics of the data as compared to the data as received;

identifying event broadcast metadata associated with the event broadcast from the normalized data;

receiving a user request from a user, wherein the user request includes the natural language command related to the event broadcast, and wherein the natural language command comprises a first condition and a second condition;

providing the natural language command as an input to the natural language processor, wherein providing the natural language command as the input to the natural language processor causes the natural language processor to generate a response to the natural language command by:

identifying moment metadata of the event broadcast metadata requested by the natural language command that satisfies the first condition and the second condition, and determining a presentation type defined by the natural language command;

retrieving, from the data storage, a subset of the data of the event broadcast, wherein the subset of the data of the event broadcast corresponds to the identified moment metadata;

creating a media representation of the subset of the data, wherein the media representation is created according to the presentation type defined by the natural language command; and causing a user device to present the media representation of the subset of the data.

2. The method of claim 1, wherein the subset of the data of the event broadcast includes one or more moment clips from the event broadcast.

3. The method of claim 2, wherein creating the media representation includes combining the one or more moment clips into a moment reel to be presented to the user.

4. The method of claim 1, wherein causing a user device to present the media representation further comprises causing the user device to present a graphical overlay on the event broadcast as the event broadcast is being presented for the user.

5. The method of claim 1, wherein the user request is a text or a speech request.

6. The method of claim 1, wherein the subset of the data can include closed captioning data interpreted from the event broadcast by the natural language processor.

7. A non-transitory computer-readable medium storing instructions that, when executed by a computing system within a cloud provider network, cause the computing system to perform operations comprising:

prior to receiving a natural language command, adjusting audio characteristics and video characteristics of data of an event broadcast as compared to the data as received;

identifying event broadcast metadata associated with the event broadcast from the normalized data;

receiving a request, wherein the request includes the natural language command related to the event broadcast of an event;

providing the natural language command as an input to a natural language processor, wherein providing the natural language command as the input to the natural language processor causes the natural language processor to generate a response to the natural language command by identifying a characteristic of the event broadcast metadata requested by the natural language command, and wherein the natural language command comprises a first condition and a second condition;

retrieving a subset of a set of data of the event broadcast, wherein the subset of the set of the data corresponds to the characteristic;

creating a media representation of the subset of the set of data of the event that satisfies the request; and causing a user device to present the media representation of the subset of the set of data.

8. The non-transitory computer-readable medium of claim 7, wherein the characteristic is associated with moment metadata.

9. The non-transitory computer-readable medium of claim 7, wherein the natural language command further identifies a presentation type defined by the natural language command.

10. The non-transitory computer-readable medium of claim 9, wherein the media representation is created according to the presentation type.

11. The non-transitory computer-readable medium of claim 7, wherein the subset of the set of data of the event broadcast includes one or more moment clips from the event broadcast.

12. The non-transitory computer-readable medium of claim 11, wherein the instructions, when executed, further cause the computing system to perform operations comprising combining the one or more moment clips into a moment reel to be presented at a presentation device.

13. The non-transitory computer-readable medium of claim 7, wherein the instructions, when executed, further cause the computing system to perform operations comprising presenting a graphical overlay on the event broadcast as the event broadcast is being presented at a presentation device.

14. The non-transitory computer-readable medium of claim 7, wherein the request is a text or a speech request.

15. The non-transitory computer-readable medium of claim 7, wherein the subset of the set of data can include closed captioning data interpreted from the event broadcast by the natural language processor.

16. An interactive broadcast system comprising:

a memory, wherein the memory is configured to store computer-executable instructions; and one or more processors in communication with the memory, wherein the computer-executable instructions, when executed by the one or more processors, configure the one or more processors to perform operations including:

prior to receiving a natural language command, adjusting audio characteristics and video characteristics of data of an event broadcast as compared to the data as received;

identifying event broadcast metadata associated with the event broadcast from the normalized data;

receiving a user request, wherein the user request includes the natural language command related to the event broadcast;

providing the natural language command as an input to a natural language processor, wherein providing the natural language command as the input to the natural language processor causes the natural language processor to generate a response to the natural language command by identifying a characteristic of the event broadcast metadata requested by the natural language command, and wherein the natural language command comprises a first condition and a second condition;

creating a media representation that presents the response and satisfies the first condition and the second condition; and causing a user device to present the media representation.

17. The interactive broadcast system of claim 16, wherein the natural language processor identifies a characteristic requested by the natural language command.

18. The interactive broadcast system of claim 17, wherein the characteristic is associated with moment metadata.

19. The interactive broadcast system of claim 16, wherein the natural language command further identifies a presentation type defined by the natural language command.

20. The interactive broadcast system of claim 19, wherein the media representation is created according to the presentation type.

* * * * *